United States Patent [19]

Gronowski et al.

[11] Patent Number: 4,858,165

[45] Date of Patent: Aug. 15, 1989

[54] APPARATUS AND METHOD FOR ACCELERATION OF EFFECTIVE SUBTRACTION PROCEDURES BY THE APPROXIMATION OF THE ABSOLUTE VALUE OF THE EXPONENT ARGUMENT DIFFERENCE

[75] Inventors: Paul E. Gronowski, Leominster; Victor Peng, Shrewsbury; Nachum M. Gavrielov, Ashland, all of Mass.

[73] Assignee: Digital Equipment Corporation, Maynard, Mass.

[21] Appl. No.: 64,835

[22] Filed: Jun. 19, 1987

[51] Int. Cl.[4] .............................................. G06F 7/50
[52] U.S. Cl. ................................................... 364/748
[58] Field of Search .............................. 364/748, 768

[56] References Cited

U.S. PATENT DOCUMENTS 4,639,887 1/1987 Farmwald ........................... 364/748
4,644,490 2/1987 Korayashi et al. ................. 364/748

FOREIGN PATENT DOCUMENTS 0145465 6/1985 European Pat. Off. ............ 364/748

OTHER PUBLICATIONS

Earle et al., "Exponent Differences and Preshifter", *IBM Technical Disclosure Bulletin*, vol. 9, #7, pp. 848–849, Dec. 1966.
Binderman et al., "The MicroVAX 78132 Floating Point Chip", *Digital Technical Journal*, No. 2, Mar. 1986, pp. 24–36.

Primary Examiner—Gary V. Harkcom
Assistant Examiner—Dale M. Shaw
Attorney, Agent, or Firm—William W. Holloway; William C. Cray

[57] ABSTRACT

The arithmetic operations performed for floating point format numbers involve procedures having a multiplicity of major steps. In the performance of the effective subtraction operation, the determination of absolute value of the difference between the operand exponent arguments must be obtained in order to determine the correct procedure. In the present invention, a difference between a subset of the operand exponent arguments is calculated and the result of this calculation is used to anticipate the correct procedure. By careful selection of the anticipated correct procedure, when the selection is erroneous, the correct result is immediately available. The availabilty of the correct result is achieved by selecting the subset of operand exponent arguments so that, in the event that the result is erroneous, the correct difference is such that the associated operand fraction (i.e., to be shifted by the amount of the difference) is shifted completely out of the operand fraction field (stored in a register).

17 Claims, 7 Drawing Sheets

| TDELTA (E) | DELTA (E) | \|DELTA(E)\| | PREDICTED FLOW STATUS | FINAL FRACTION RESULT |
|---|---|---|---|---|
| 0 | 0 | 0 | CORRECT | Fa − Fb |
| 0 | >= 64 | >= 64 | INCORRECT | Fa |
| 0 | =< −64 | >= 64 | INCORRECT | Fb |
| 1 | 1 | 1 | CORRECT | Fa − Fb/2 |
| 1 | >= 65 | >= 65 | INCORRECT | Fa |
| 1 | =< −63 | >= 63 | INCORRECT | Fb |
| −1 | −1 | 1 | CORRECT | Fb − Fa/2 |
| −1 | >= 63 | >= 63 | INCORRECT | Fa |
| −1 | =< −65 | >= 65 | INCORRECT | Fb |
| OTHER | >1 AND =< 53 | >1 AND =< 53 | CORRECT | $Fa - Fb/2\{DELTA(E)\}$ |
|  | >53 | >53 | CORRECT | Fa |
|  | <−1 AND >= −53 | >1 AND =< 53 | CORRECT | $Fb - Fa/2\{|DELTA(E)|\}$ |
|  | <−53 | >53 | CORRECT | Fb |

WHERE:

- Ea     IS THE EXPONENT FIELD OF THE FIRST OPERAND
- Eb     IS THE EXPONENT FIELD OF THE SECOND OPERAND
- Fa     IS THE FRACTION FIELD OF THE FIRST OPERAND
- Fb     IS THE FRACTION FIELD OF THE SECOND OPERAND
- DELTA (E)     IS THE DIFFERENCE BETWEEN THE EXPONENTS OF THE TWO OPERANDS: Ea − Eb
- TDELTA (E)     IS THE 6 LEAST SIGNIFICANT BITS OF DELTA (E)
- \|DELTA (E)\|     IS THE ABSOLUTE VALUE OF DELTA (E)
- OTHER     REFERS TO TDELTA (E) HAVING A VALUE OTHER THAN 0, 1, OR −1

*FIG. 6A.*

| TDELTA(E) | T7DELTA(E) | DELTA(E) | \|DELTA(E)\| | PREDICT FLOW STATUS | FINAL FRACTION RESULT |
|---|---|---|---|---|---|
| OTHER i.e. >1 AND =<62 | >1 AND =<62 | >1 AND =<62 | >1 AND =<62 | CORRECT | Fa −Fb/2 {T7DELTA(E)} |
| | >1 AND =<62 | >129 | >129 | INCORRECT | Fa |
| | >1 AND =<62 | =<−66 | >=66 | INCORRECT | Fb |
| | >=66 AND <127 | >=66 | >=66 | INCORRECT | Fa |
| | >=66 AND <127 | >=−62 AND <−1 | >1 AND =<62 | CORRECT | Fb −Fa/2 {T7DELTA(E)} |
| | >=66 AND <127 | <−129 | >129 | INCORRECT | Fb |

T7DELTA(E) IS THE 7 LEAST SIGNIFICANT BITS OF DELTA(E)

*FIG. 6B.*

APPARATUS AND METHOD FOR ACCELERATION OF EFFECTIVE SUBTRACTION PROCEDURES BY THE APPROXIMATION OF THE ABSOLUTE VALUE OF THE EXPONENT ARGUMENT DIFFERENCE

RELATED U.S. PATENT APPLICATIONS

The following U.S. Patent applications are related to the present invention.

Apparatus and Method for Execution of Floating Point Operations, invented by Sridhar Samudrala, Victor Peng and Nachum M. Gavrielov, having Ser. No. 06/879,337, filed June 27, 1986 and assigned to the assignee of the present Application.

Apparatus and Method for Accelerating Floating Point Addition and Subtraction Operations by Accelerating the Effective Subtraction Procedure, invented by Vijay Maheshwari, Sridhar Samudrala and Nachum Moshe Gavrielov, having Ser. No. 07/064,836 filed on June 19, 1987 and assigned to the assignee of the present Application.

BACKGROUND OF THE INVENTION

1. Field of the Invention

This invention relates generally to data processing systems and, more particularly, to the apparatus for executing the floating point operations of a data processing system.

2. Description of the Related Art

Data processing systems are typically provided with the capability of manipulating numerical quantities stored in the floating point format. In the floating point format, a numerical quantity is represented by a fraction value and by an (exponent) argument value. The argument value represents the power to which the exponent base is raised, while the fraction value represents the number multiplying exponential portion of the number. The principal advantage of the floating point format is the increased range of numbers that can be manipulated in the data processing systems without instituting extraordinary procedures or conventions. A floating point processor capable of advantageously using the invention disclosed herein is described in "The MicroVAX 78132 Floating Point Chip" by William R. Bidermann, Amnon Fisher, Burton M. Leary, Robert J. Simcoe and William R. Wheeler, Digital Technical Journal, No. 2, March, 1986, pages 24–36.

The floating point format has the disadvantage that the execution of addition and subtraction operations in this data format is more complex and requires a greater time period than the same operation in the standard data format. This complexity if the result of having to align fractions prior to their addition or subtraction so that the exponents are identical, and then potentially having to normalize the result, i.e., shifting the fraction of the resulting quantity until a logic "1" is stored in the most significant bit position and adjusting the argument of the exponent accordingly.

Referring now to FIG. 1, the addition and subtraction operations are defined in terms of effective addition and effective subtraction operations which more correctly identify related operation sequences. The addition and subtraction operations 101 are grouped into an effective addition operation 102 and an effective subtraction operation 103. The effective addition operation 102 includes the operations of adding operands that have the same sign and subtracting operands that have different signs. The effective subtraction operation 103 includes the addition of operands with differing signs and the subtraction of operands with the same sign.

Referring next to FIG. 2, the steps in performing the effective subtract operation, according to the related art, is shown. In step 201, the difference between the exponents is determined. Based on the difference between exponents, the logic signals representing the smaller operands are shifted until the arguments of the exponents representing the two operands are the same, i.e., the operand fractions are aligned, in step 202. In step 203, the aligned quantities are then subtracted. If the resulting quantity is negative, then the 2's complement must be calculated, i.e., the subtrahend was larger than the minuend in step 204. In step 205, the most significant non-zero bit position (i.e., the leading logic "1" signal) is determined. Based on this bit position, the resulting quantity operand, is normalized, the leading logic "1" signal is shifted to the most significant bit position and the argument of the exponent is adjusted accordingly in step 206. In step 207, the rounding of the resulting operand fraction is performed. As will be clear to those familiar with the implementation of floating point operations, the seven steps of the effective subtraction operation of FIG. 2 can require a relatively long time for their execution.

A need has therefore been felt for a procedure and associated apparatus for accelerating the effective subtraction operation.

FEATURES OF THE INVENTION

It is an object of the present invention to provide an improved data processing system.

It is a feature of the present invention to provide improved apparatus for the execution of floating point operations.

It is another feature of the present invention to provide a technique for acceleration of the effective subtraction operation in a floating point unit.

It is yet another feature of the present invention to use a difference between a subset of signals of the operand exponent arguments to accelerate an effective subtraction operation.

It is still another feature of the present invention to begin an effective subtraction procedure based on the difference between a subset of operand exponent argument signals prior to the availability of the complete difference between the exponent arguments.

SUMMARY OF THE INVENTION

The aforementioned and other features are accomplished, according to the present invention, by providing a floating point execution that includes, in addition to the apparatus for determining the difference between operand exponential arguments, apparatus for determining the difference between a subset of the operand exponent arguments. The subset difference apparatus provides a result prior to a determination of the complete difference between the operand exponent arguments. The subset difference is used to begin subtraction of differences between operand fractions (or fractional portions thereof). The procedures are chosen such that when the complete operand argument difference is different from the subset operand argument difference, the correct result fraction is one of the operand fractions, a quantity that is available.

These and other features of the present invention will be understood upon reading of the following description along with the drawings.

BRIEF DESCRIPTION OF THE DRAWINGS

FIG. 6A and FIG. 6B illustrate the effective subtraction flows initiated after determination of the difference between selected portions of the exponential arguments.

DESCRIPTION OF THE PREFERRED EMBODIMENT

Detailed Description of the Figures

Figure 1:
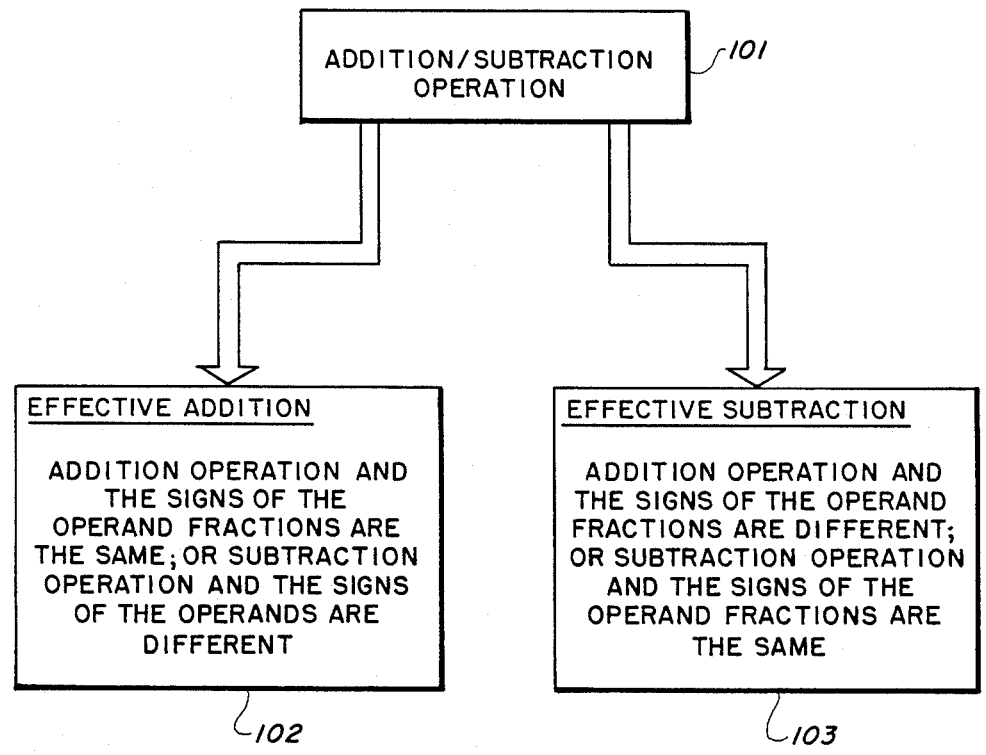
FIG. 1 illustrates the relationship between the addition and subtraction operations and the effective addition and the effective subtraction operations.
Figure 2:
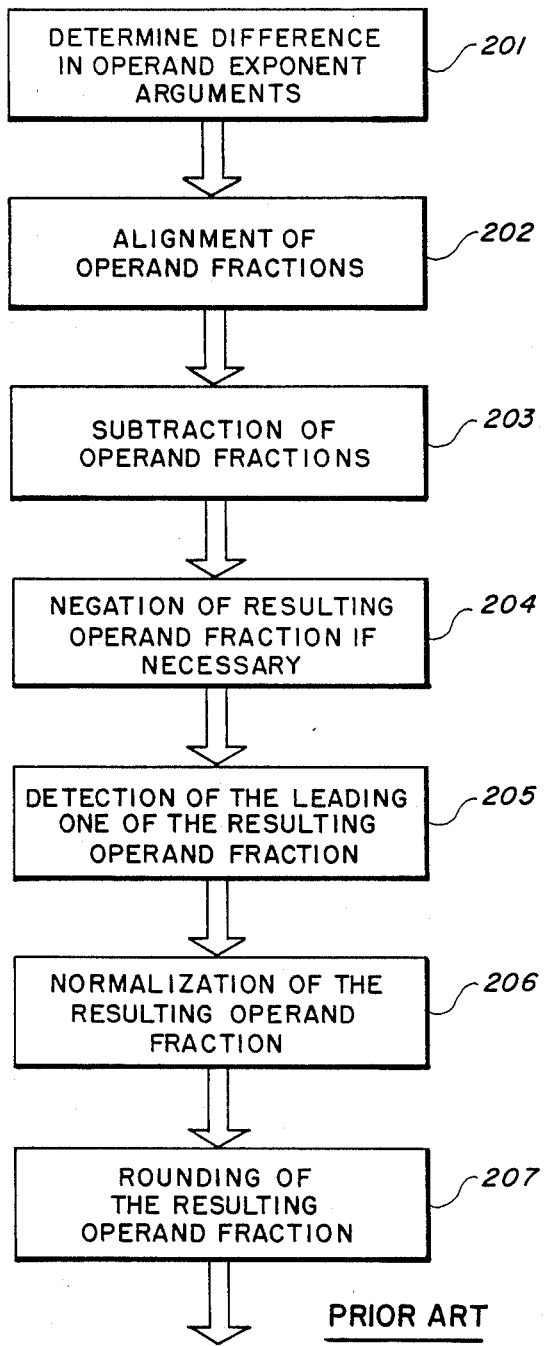
FIG. 2 illustrates the steps for performing the effective subtraction operation according to the related art.

FIG. 1 and FIG. 2 have been described with reference to the related art.

Figure 3:
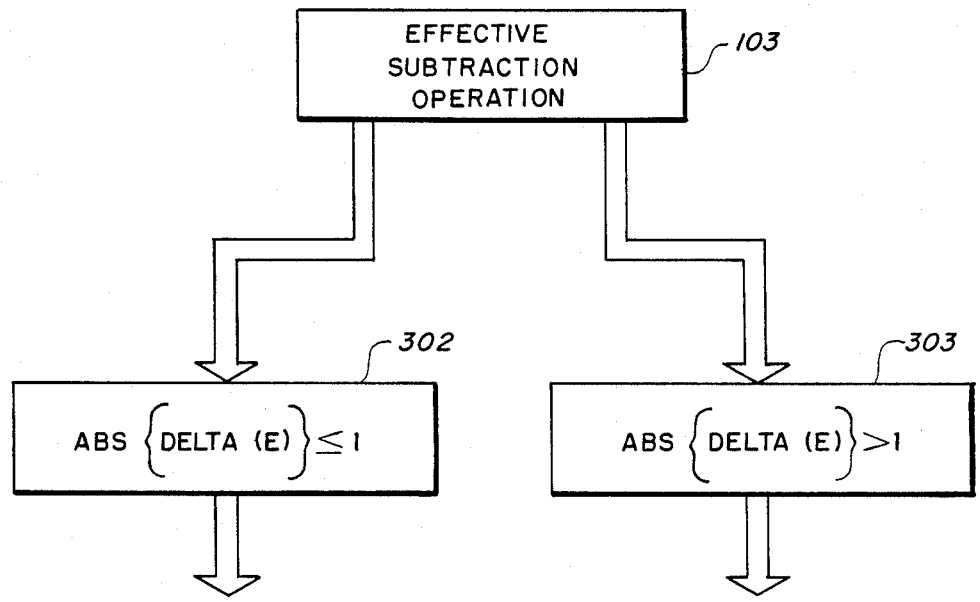
FIG. 3 illustrates the two procedures into which the effective subtract operations are divided in order to accelerate their execution.

Referring to FIG. 3, the effective subtraction operation can be accelerated by first considering the situation where the absolute value of the difference in the arguments of the exponents of the two operands, or the absolute value of DELTA(E), is $<1$ (i.e., or 1) or is $>1$ (i.e., all other values), that is ABS{DELTA(E)}$\leq 1$ or ABS{DELTA(E)}$>1$.

Figure 4:
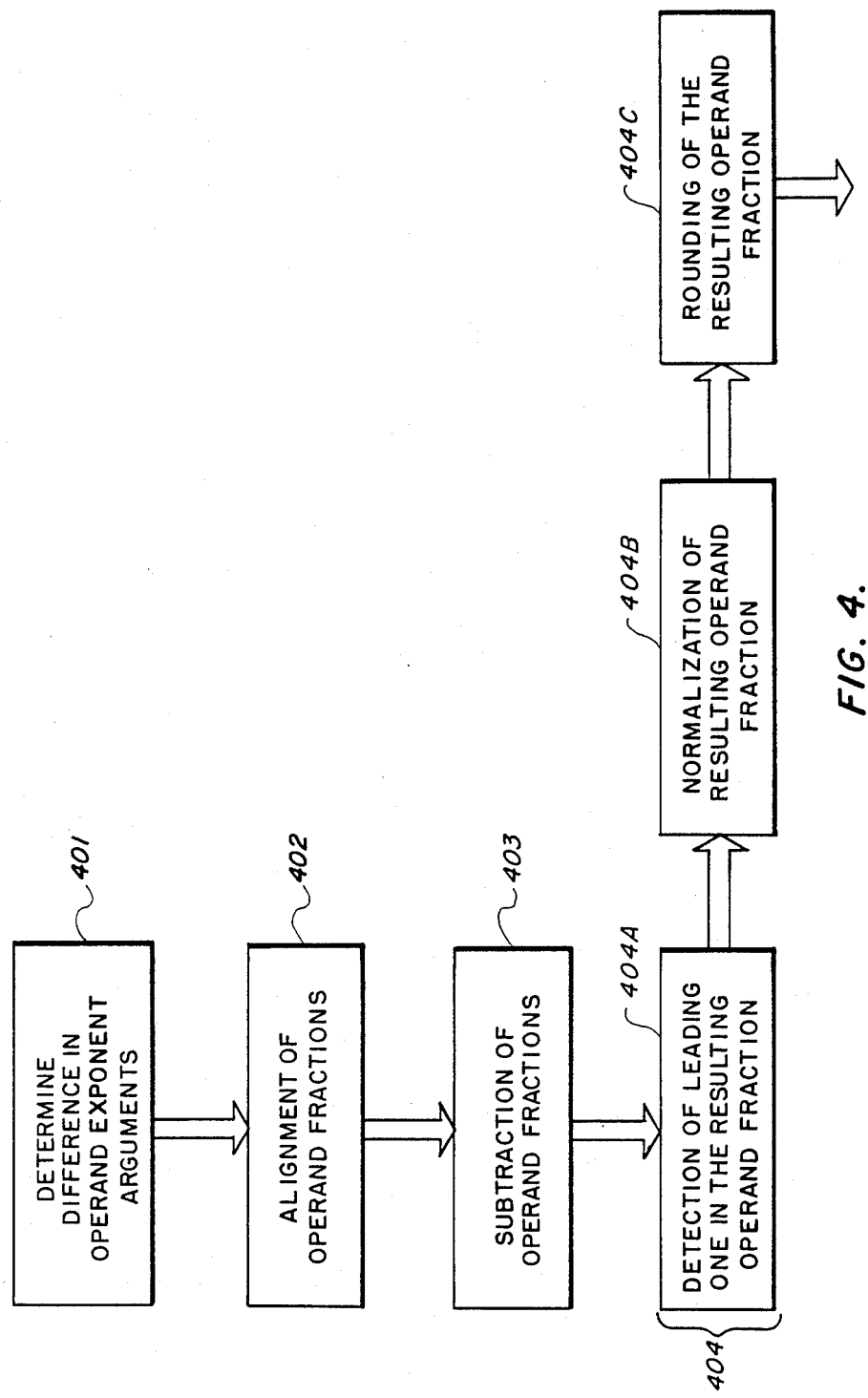
FIG. 4 illustrates the steps in the effective subtraction operation when the absolute value of the difference of the exponent arguments is greater than one.

Referring next to FIG. 4, the situation where ABS{DELTA(E)}$>1$ is examined in more detail. Comparing FIG. 4 with FIG. 2, the determination of the difference in the arguments of the exponents is performed in each case, in step 201 and in step 401. However, because the larger operand is identified, the subtraction operation, performed in steps 203 and 403 can be performed to insure that a positive resultant quantity is obtained by the operation, obviating, in the process illustrated in FIG. 4, the necessity of a step equivalent to the step 204 for the negation of the resulting operand. Because of the amount of the difference between operands, the result that the normalization will require a shift of at most one bit position for the resulting operand. A one bit position shift does not require a separate step and the detection of the leading logic "1" signal in step 404A, the normalization in step 404B and the rounding operation in step 404C can be considered a single time consuming step 404 rather than three time consuming steps (i.e., step 205, 206 and 207) in FIG. 2.

Figure 5:
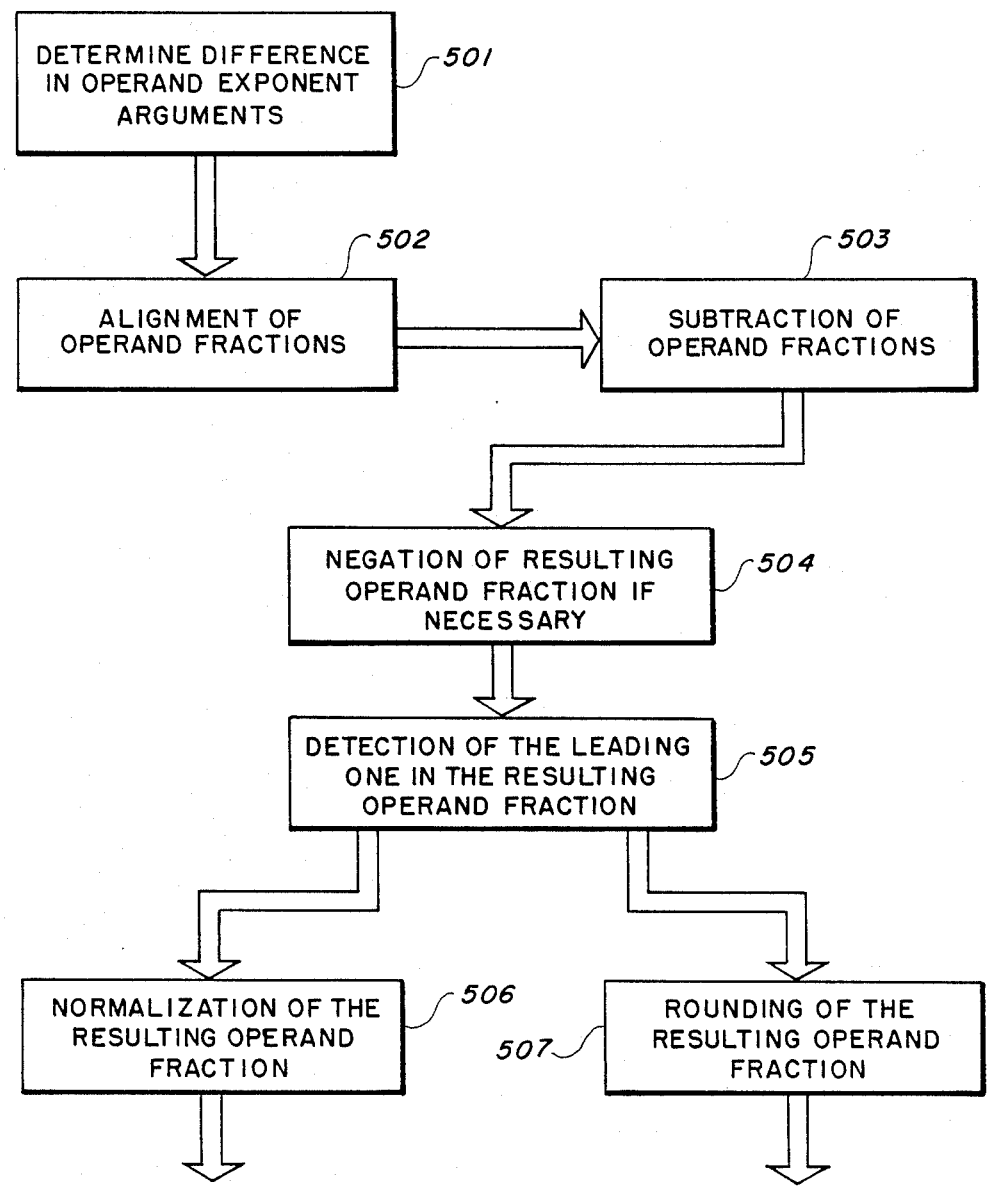
FIG. 5 illustrates the steps in the effective subtraction operation when the absolute value of the difference of the exponent arguments is less than or equal to one.

Referring next to FIG. 5, the technique for reducing the time to execute (i.e., by accelerating) the effective subtraction operation when ABS{DELTA(E)}$\leq 1$ is shown. In step 501, the difference between the exponent arguments is determined. Because of the small difference in the arguments, the alignment of the fractions in step 502 can be performed without requiring a separate step (or "on the fly") before performing the subtraction step 503. The negation step 504 can be required, but either the normalization step 506 or the rounding step 507 is required, but not both steps. The procedure reduces the seven major steps to five major steps by the floating point apparatus.

Referring next to FIG. 6A, the results of determining the difference, TDELTA(E), between the (six) least significant position subset of the operand exponent argument, the operation involving the operand fractions initiated as a result TDELTA(E), the correct DELTA(E) and the final fraction result are shown. When, for example the TDELTA(E)=0, then the operation for determining FRACTION$_A$-FRACTION$_B$ is begun. The result of calculating DELTA(E) can take only one of three values, i.e., 0, $>$ or =64, and $<-$ or =64. When DELTA(E)=0, then the correct final fraction is FRACTION$_A$-FRACTION$_B$. When DELTA(E)$>$ or =64, then the correct final fraction =FRACTION$_A$. When DELTA(E)$\leq -64$, then the correct final fraction result is FRACTION$_B$. FRACTION$_A$ and FRACTION$_B$ are available and no computation is necessary to provide these results. These operand fractions are correct because the operand fraction typically (but not necessarily) includes only 53 positions, so a shift by 64 or more positions reduces the associated operand fraction to 0. Similarly, when TDELTA(E)=1, the computation of the final fraction result FRACTION$_A$-FRACTION$_B$/2 is initiated. When this final fraction result is not correct, based on the calculation of DELTA(E), the correct final fraction result will be either FRACTION$_A$ or FRACTION$_B$. When TDELTA(E)=$-1$, the computation of the final fraction FRACTION$_B$-FRACTION$_A$/2 is begun. If this fraction is incorrect, the correct final fraction result will be FRACTION$_A$ or FRACTION$_B$ as indicated in FIG. 6A. When DELTA(E) takes on a value different from 0, 1 and $-1$, FIG. 6A lists the correct final fraction results under 'other' as a function of DELTA(E). In order to accelerate the computation of the final fraction result, several techniques can be employed, the technique of the preferred embodiment being shown in FIG. 6B. In this technique, a difference T7DELTA(E) is calculated, being the difference between the seven least significant bit signals of the operand exponent argument. When TDELTA(E)$>1$ and $<$ or =62, and T7DELTA(E)$>1$ and $<$ or =62, then the computation of the final fraction FRACTION$_A$-{FRACTION$_B$/$2^{T7DELTA(E)}$} is initiated. This quantity will be correct when DELTA(E)$>1$ and $<$ or =62. Otherwise, FRACTION$_A$ is used when DELTA(E)$>129$ and FRACTION$_B$ is used when DELTA(E) $<$ or $=-66$. When TDELTA(E)$>1$ and $<$ or =62 and T7DELTA(E)$>$ or =66 and $<127$, then computation is begun on the final fraction result FRACTION$_B$-{FRACTION$_A$/$2^{-T7DELTA(E)}$}. This final fraction result will be correct when DELTA(E)$>$ or $=-62$ and $<-1$. Otherwise, the final fraction result will be FRACTION$_A$ when DELTA(E)$>$ or =66 or FRACTION$_B$ when DELTA(E)$<-129$.

Figure 7:
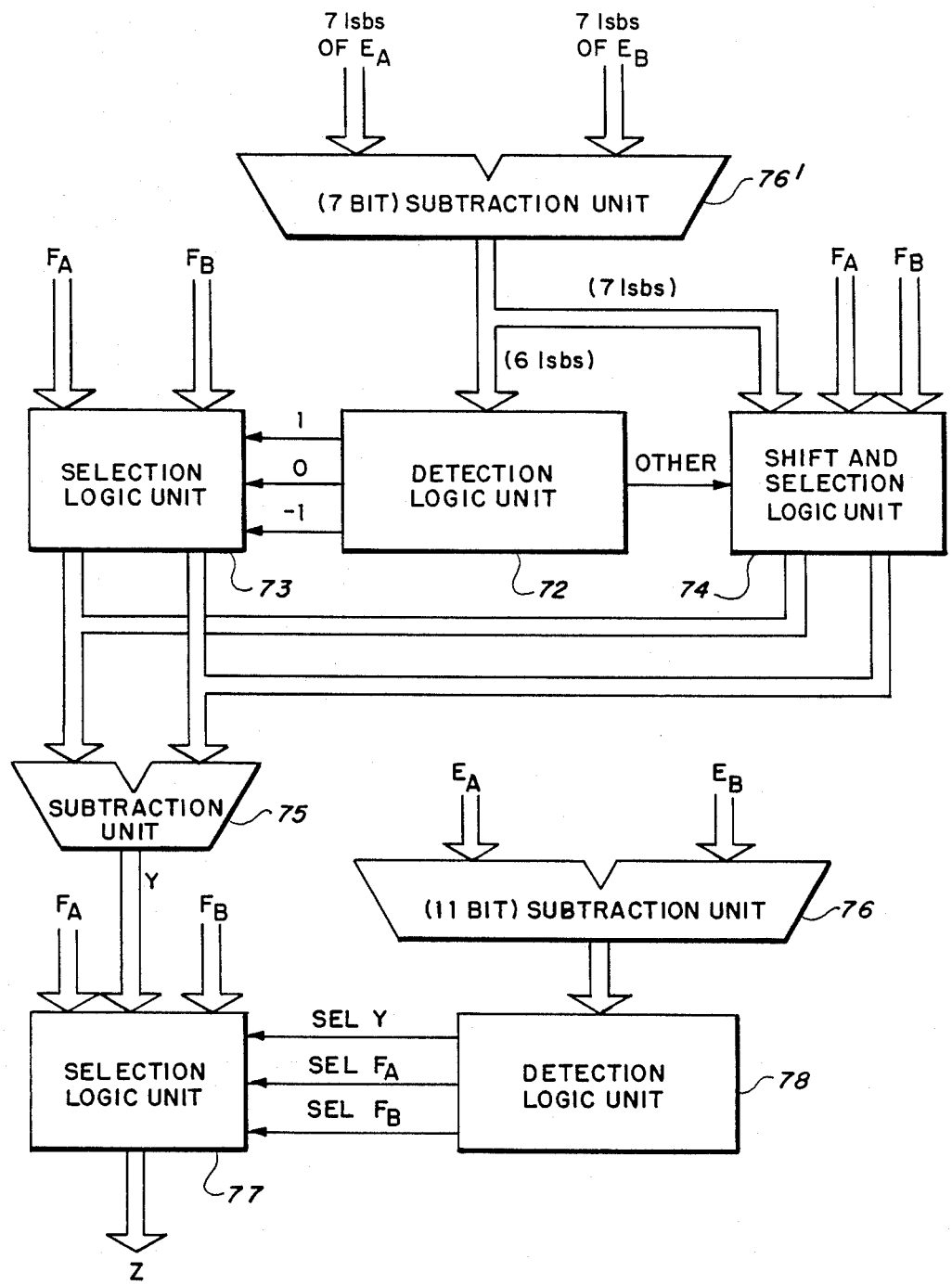
FIG. 7 is a block diagram of the apparatus implementing the present invention.

Referring next to FIG. 7, the apparatus implementing the procedures of FIG. 6A and FIG. 6B is shown. The 7 least significant bits (1 sbs) of operand exponent argument E$_A$ and the 7 least significant bits of operand exponent E$_B$ are applied to (7 bit) subtraction unit 76'. The 6 least significant bit difference, also referred to as TDELTA(E), is applied to detection and logic unit 72, while the 7 bit difference between E$_A$ and E$_B$, also referred to as T7DELTA(E) is applied to shift and selection logic unit 74. The shift and selection logic unit 74 also has the operand fractions FRACTION$_A$ (F$_A$) and FRACTION$_B$ (F$_B$) and a control signal from detection logic unit 72 applied thereto. The detection logic unit 72, based on TDELTA(E), can make the decision between the 1, −1, 0 and other procedures of FIG. 6A. The shift and selection logic unit 74, based on T7DELTA(E), selects the procedures outlined in FIG. 6B. The output signals X$_A$ and X$_B$ from shift and logic unit 74 are the individual quantities in the final fraction column of FIG. 6B, i.e., the quantities determined when TDELTA(E)>1 and < or = 62 and when T7DELTA(E)>1 and < or = 62 or when T7DELTA(E)> or = −62 and <−1. The output signals X$_A$ and X$_B$ from shift and selection logic unit 74 are applied to subtraction unit 75. Selection logic unit 73 receives the operand fraction signals F$_A$ and F$_B$ and control signals from detection logic unit 72. The selection logic unit 73 determines the components of the final fraction result calculation illustrated in the final fraction result column of FIG. 6A. The output signals of the selection logic unit 73, X$_A$ and X$_B$, are applied to subtraction unit 75. The control signals from detection logic unit 72 determine whether the output signals from selection logic unit 73 or the output signals from shift and selection logic unit 74 are applied to subtraction unit 75. The result of the operation of the subtraction unit 75, Y, is applied to selection logic unit 77 along with the operand fractions F$_A$ and F$_B$. The operand exponent arguments E$_A$ and E$_B$ are applied to (11 bit) subtraction unit 76 where DELTA(E) is calculated. DELTA(E), the output signal from subtraction unit 76, is applied to detection logic unit 78. The detection logic unit 78, based on DELTA(E), selects the operand fractions, F$_A$ or F$_B$ or the output signal of the subtraction unit 75 as the final fraction result (Z). In the preferred embodiment, subtraction units 76 and 76' are implemented in the same piece of apparatus, the 6 1 sb signals and the 7 1 sb signals being available prior to the complete 11 bit difference being determined.

Operation of the Preferred Embodiment

When the effective subtraction operation is performed, the value of the difference between the exponent arguments is required to specify the operation involving the operand fractions. The present invention accelerates the effective subtraction operation by calculating a difference between an subset of signal positions of an operand exponent argument. Based on the operand exponent argument subset difference, a difference in the operand fractions (or fractional portion thereof) is determined during the time that the difference between the complete operand exponent arguments is being calculated. The subset is chosen so that when the complete difference is determined and the current procedure determined to be the incorrect procedure, the correct resulting fraction is available. This availability is accomplished by providing that, when the operand fractions are shifted by an amount represented by any operand argument position not in the subset, the shifted operand fraction has a value of zero. Therefore, the non-shifted operand fraction is all that remains and becomes the final resulting fraction. The difference in the operand argument subsets can identify the only combination of operand fractions for which an operation (subtraction) must be performed. This operation requiring a calculation is initiated prior to the determination of the difference between the complete operand arguments. Thus, when the difference between the complete operand arguments is available, the final fraction result, if a calculation is required, will be at least in progress, thereby accelerating the computation. The other possible final fraction results are operand fractions and are available based on the differences between the complete operand exponent arguments.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for performing floating point addition and subtraction operations, said apparatus comprising:
    addition means for performing floating point effective addition; and
    subtraction means for performing floating point effective subtraction, said subtraction means including:
    first subtraction means responsive to initial operand exponent argument signals for identifying correct final fraction signals;
    second subtraction means responsive to a subset of said initial operand exponent argument signals for identifying possible final fraction signals;
    third subtraction means responsive to said second subtraction means and to said initial operand fraction signals for providing a first possible final fraction signals; and
    selection means responsive to said first subtraction means for selecting said correct final fraction signals from said first possible final fraction signals and said initial operand fraction signals.

2. The apparatus for performing floating point addition and subtraction operations of claim 1 wherein said third subtraction means has combining means for providing a combined operand fraction from two initial operand fraction signals, wherein a first of said initial operand fraction signals is shifted by an amount determined by said second subtraction means prior to combining in said combining means.

3. The apparatus for performing floating point addition and subtraction operations of claim 2 wherein said second subtraction is a portion of said first subtraction means.

4. The apparatus for performing floating point addition and subtraction of claim 3 wherein said operand exponential argument signal subset can store a quantity greater than the number of positions representing an operand fraction.

5. The apparatus for performing floating point addition and subtraction operations of claim 1 wherein said first and second subtraction means operate in parallel.

6. The apparatus for performing floating point addition and subtraction operations of claim 1 wherein said second and said third subtraction means determines said possible final fraction signals requiring calculation in parallel with operation of said first subtraction means.

7. The apparatus for performing floating point addition and subtraction operations of claim 1 further comprising operation means responsive to operand fraction signs for selecting a one of an effective addition and an effective subtraction operation.

8. The method of performing an effective subtraction operation for floating point operands, said method comprising the steps of:
    determining a first difference between two operand exponent argument signals, said first difference determining how two operand fractions are to be combined;

determining a second difference between a subset of said two operand exponent signals, said second difference defining a possible combination of said two operand fractions; and selecting a correct final fraction result from a one of said possible operand combination and said operand fractions.

9. The method of performing an effective subtraction operation of claim 8 further comprising the step of initiating calculation of said possible operand combination in parallel with said determining said first difference.

10. The method of performing an effective subtraction operation of claim 8 further comprising the step of selecting said operand exponent argument subset of a plurality of least significant bits, said plurality of least significant bits representing a quantity larger than the number of operand fraction bit positions.

11. The method of performing an effective subtraction operation of claim 8 further comprising the step of controlling said selecting step by said first difference.

12. The method of performing an effective subtraction operation of claim 8 further comprising the steps of unsing said second difference to control shifting of said operand fractions, and applying said operands to a subtraction circuit.

13. Apparatus for implementing an effective subtraction operation for floating point operands, said apparatus comprising:

first subtraction means for determining a first difference between operand exponent argument signals;

second subtraction means for determining a second difference between a selected subset of said operand exponent argument signals;

third subtraction means responsive to said second difference for determining a third difference between operand fractions applied thereto; and selection means for selecting a one of said third difference and said operand fractions.

14. The apparatus for implementing an effective subtraction operation of claim 13 further comprising shifting means, wherein said operand fractions applied to said third subtractin means are shifted by said shifting means by an amount determined by said second difference.

15. The apparatus for implementing an effective subtraction operation of claim 14 wherein said selection means is responsive to said first difference.

16. The apparatus for implementing an effective subtraction operation of claim 15 wherein said subset includes a plurality of least significant signals of said operand exponent arguments, said plurality being at least large enough to represent a quantity greater than the number of bit positions of said operand fractions.

17. The apparatus for implementing an effective subtraction operation of claim 16 wherein said shifting means includes a first shifting means for shifting said operand fractions by 0 and by 1 bit position, and a second shifting means for shifting said operand fractions by greater than one bit position.

* * * * *